Patented June 22, 1954

2,681,893

UNITED STATES PATENT OFFICE 2,681,893

WALLABA WOODFLOUR MOLDING COMPOSITION

Frederick A. Hessel and William B. Canfield, Montclair, N. J., assignors, by direct and mesne assignments, of one-half to Montclair Research Corporation, a corporation of New Jersey, and one-half to Ellis-Foster Company, a corporation of New Jersey No Drawing. Application February 14, 1949, Serial No. 76,429

9 Claims. (Cl. 260—17.2)

This invention relates to new and improved thermosetting molding compositions. In particular, it relates to molding compositions comprising wood of the wallaba tree *Eperua falcata*. The forests of British Guiana contain large and fairly pure stands of wallaba trees.

Wallaba wood is characterized by a reddish resinous substance present to the extent of about 25%. The resin is exceedingly complex in composition, as it appears to become insoluble and infusible in the presence of aldehydes or aldehyde-containing substances and heat, which may be indicative of the presence of phenolic bodies. Moreover, it does not appear to be related to rosin or other natural resin and does not dissolve when heated with drying oils such as linseed oil. The resin is soluble in ethyl alcohol and acetone but insoluble in hydrocarbons and ethers. It is also very soluble in dilute aqueous sodium carbonate or sodium hydroxide solutions.

The resin may be separated from the wood most easily by extraction with hot ethyl alcohol and is recovered from the solution by evaporation of the solvent. It is a hard brittle dark-red product, which initially softens on heating but does not melt completely without decomposition. The resin may also be separated from the wood by repeated extraction with dilute aqueous sodium carbonate solution. When the alkaline solution is neutralized with dilute acid a finely divided resin precipitates, which may be filtered off, washed and dried.

We have found that since the resin is present in the wood to the extent of about 25% and is heat-convertible with aldehydes, the wood after grinding may be hot-molded upon addition of an aldehyde-yielding compound. Thus, a relatively inexpensive molding composition is made available since the wood contains both binder and filler.

Furthermore, the resin may be separated from the wood by solvent extraction and employed as binder in a molding composition with any of the known fillers such as white pine flour, asbestos, mica, cotton flock, cellulose and the like. Also, the resin extract may be added to ground wallaba wood to increase the binder content of the molding composition.

According to another aspect of the invention, wallaba woodflour and phenolic resins may be molded together to give hard products of very excellent water and alcohol resistance. Thus it is possible, if desired, to modify the ground wallaba wood molding compositions by incorporating small amounts of any of the known binders such as phenol-formaldehyde resins, urea-formaldehyde resins, vinyl resins, celluulose esters and ethers, alkyd resin and the like, to give compositions having vastly different properties when molded.

The molding composition may be made in various ways. According to the simplest method, the wood is comminuted to woodflour and mixed with the aldehyde substance and whatever other material that is to be included, such as additional binder, in finely divided form. When additional wallaba resin is to be incorporated, this resin may be added as above or the wallaba wood flour may be impregnated with the necessary amount of alcohol extract (preferably partially concentrated). In any event, the wood is previously ground but the degree of fineness may be less than woodflour of ordinary woods, since it is naturally impregnated with resin. (In the examples below the wood was ground to pass a 60-mesh screen.)

An aldehyde is an essential element of the composition and may be formaldehyde, furfural or other aldehyde known to be useful in the phenol-aldehyde art. A condensing agent (alkaline or acidic) is also included. Hexamethylenetetramine (which yields both aldehyde and condensing agent therefor) is a preferred aldehyde substance and is added in amount from about 2% to 12% based on the wallaba woodflour or from about 8% to 48% based on the wallaba resin content of the molding composition.

Molding may be done with conventional procedures. A preliminary densification of the composition as by working on rolls is helpful in putting it in a form which shows less gassing during the curing operation.

The examples which follow are illustrative and should not be considered limiting. All parts are by weight.

*Example 1.*—One hundred parts of wallaba woodflour and 7.5 parts of hexamethylenetetramine were ballmilled together to form a homogeneous composition. When molded at 300° F. for 3 minutes at 3000 lbs. per sq. in. in a disk-mold, the moldings showed plastic flow with a resulting degree of gloss, being dark-red in color and very strong. After boiling in water for 1 hour a disk showed 6.25% water absorption and no disintegration. In anhydrous ethanol for 24 hours at 25° C., the loss in weight after drying was 0.52%, indicating that the resin of the wood had heat-cured during the molding operation.

*Example 2.*—A mixture of 32.5 parts of wallaba woodflour, 16.25 parts of wallaba resin (obtained by extraction of the ground wood with hot alcohol), and 2.4 parts of hexamethylenetetramine was ballmilled together until uniformly mixed. When molded (300° F., 3 minutes, 3000 lbs. per sq. in.) in a disk mold, the composition produced molded pieces having a very good glaze and showing a good degree of plastic flow. The molded disks were very strong, water-absorption in boiling water for 1 hour being 3.14% and loss in weight in anhydrous ethanol during 24 hours at 25° C. being 0.2%.

*Example 3.*—A mixture of 50 parts of wallaba woodflour, 12.5 parts of wallaba resin (extracted from wood with alcohol), and 2.4 parts of hexamethylenetetramine was ballmilled for 3 hours and molded at 325° F. for 5 minutes at 4000 lbs. Water absorption was 3.38% in boiling water for an hour and 1.27% in water at room temperature for 24 hours.

*Example 4.*—A series of molding compositions was prepared by ballmilling 25 parts of wallaba woodflour, 12.5 parts of wallaba resin and hexamethylenetetramine in proportions as follows:

|   | Parts |
|---|---|
| A | 0.47 |
| B | 0.94 |
| C | 1.41 |
| D | 1.88 |

Molded disks showing good glaze and good degree of plastic flow were obtained in each case when the compositions were molded at 300° F. for 3 minutes at 3000 lbs. per sq. in. Loss in weight in 24 hours when immersed in anhydrous alcohol and gain in weight in 1 hour in boiling water were as follows:

|   | Loss in weight in ethanol, percent | Gain in weight in in boiling water, percent |
|---|---|---|
| A | 0.40 | 4.95 |
| B | 0.30 | 4.52 |
| C | 0.20 | 3.53 |
| D | 0.28 | 3.50 |

During molding operations gassing or formation of bubbles is very apparent, requiring breathing of the mold at intervals. Treatment of the compositions on differential rolls greatly condensed the volume and also minimized gassing. Resistance to boiling water was also somewhat improved by this treatment.

*Example 5.*—A mixture of 100 parts of wallaba woodflour, 50 parts of wallaba resin and 11.25 parts of hexamethylenetetramine was ballmilled together for 1 hour. Half of the mixture was worked on differential rolls at 25° C. for 1 minute before being molded and the rest was molded as it came from the ballmill. Disks molded at 300° F. for 3 minutes at 3000 lbs. per sq. in. showed good flow and good gloss in both cases. The milled composition showed less tendency to gas and required less breathing of the mold. Water absorption for 1 hour in boiling water was 5.16% for the unmilled composition and 3.22% for the milled.

*Example 6.*—Fifty parts of wallaba woodflour, 12.5 parts of wallaba resin, 2.4 parts of paraformaldehyde and 0.5 part of oxalic acid were ballmilled together for 3 hours and then hot-molded at 325° F. for 5 minutes at 4000 lbs. per sq. in. This composition formed strong, glossy molded pieces. Water absorption in boiling water for 1 hour was 8.41%.

*Example 7.*—In Example 6, the paraformaldehyde was replaced by an equal weight of furfural. Molded pieces of similar appearance were obtained. Water absorption (1 hour in boiling water) was 7.42%.

*Example 8.*—A phenol-formaldehyde resin was prepared by reacting 1 mole of phenol and 0.83 mole of aqueous formaldehyde in the presence of a trace of sulfuric acid. When the reaction was complete the catalyst was neutralized with calcium hydroxide and the resin dehydrated by heating under reduced pressure. The resin was prepared for molding by mixing 210 parts of the resin, 21 parts of hexamethylenetetramine, 3.15 parts of calcium oxide and 0.42 part of calcium stearate and ballmilling to a uniform composition.

A molding composition was formed by ballmilling 22.5 parts of wallaba woodflour with 7.5 parts of the above phenolic molding resin. When molded at 300° F. for 3 minutes at 3000 lbs. per sq. in. flow was excellent and strong molded disks of high gloss were obtained. Water absorption (1 hour boiling) was 1.75%.

*Example 9.*—Part of the phenolic resin of Example 7 was replaced by wallaba resin, 3 parts of the phenolic resin and 4.5 parts of wallaba resin being used. Molded disks of similar appearance were obtained. Water absorption (1 hour boiling) was 5.0%.

*Example 10.*—A series of molding compositions was prepared by ballmilling under similar conditions the following:

A. 27.5 parts wallaba woodflour
   22.5 parts phenolic molding resin (Example 7)
B. 27.5 parts pine woodflour
   22.5 parts phenolic molding resin (Example 7)
C. 27.5 parts pine woodflour
   22.5 parts wallaba resin
   2.25 parts hexamethylenetetramine
D. 50 parts wallaba woodflour
   25 parts wallaba resin
   2.5 parts hexamethylenetetramine
E. 26.6 parts wallaba woodflour
   10.05 parts wallaba resin
   3.35 parts phenolic molding resin (Example 7)
F. 36.6 parts wallaba woodflour
   6.7 parts wallaba resin
   6.7 parts phenolic molding resin (Example 7)
G. 15 parts extracted wallaba woodflour (the residue after extraction of resin)
   15 parts phenolic molding resin (Example 7)

Each composition was molded at 300° F. for 3 minutes at 3000 lbs. per sq. in. and all showed good plastic flow and formed glossy, strong molded disks. Impact strength determinations showed no significant difference and standing for 24 hours in anhydrous alcohol caused no appreciable change. Water absorption (1 hour boiling) was as follows:

|   | Per cent |
|---|---|
| A | 1.25 |
| B | 1.85 |
| C | 6.67 |
| D | 3.88 |
| E | 3.05 |
| F | 2.34 |
| G | 1.33 |

Although numerous kinds of wood have been used as fillers in molding compositions and although many woods are known which contain phenolic bodies (e. g., quebracho and other tannin-containing woods), it is believed that wallaba woodflour is unique in containing a sufficiently high content of resin (which has been found to be aldehyde-curable) that it can be formed into a molding composition merely by incorporating a small amount of aldehyde and condensing agent or a compound such as hexamethylenetetramine which constitutes aldehyde and condensing agent. Redwood when heat-masticated shows increased flow under heat and pressure but heat-mastication of wallaba produces decreased flow and tends to decrease its usefulness as a molding composition with aldehydes. Also, the wood of the mimusops or cow tree has been used in hot-molding compositions and gives increased flow, but the binder of this wood is a chicle-like substance which does not appear to be aldehyde reactive.

We claim:

1. A plastic thermosetting composition comprising wallaba woodflour containing wallaba resin and hexamethylenetetramine.

2. A plastic thermosetting composition comprising wallaba woodflour, added wallaba resin and hexamethylenetetramine.

3. The process of making a plastic thermosetting composition which comprises adding hexamethylene tetramine to wallaba woodflour.

4. The composition of claim 1 in which the hexamethylene tetramine is from 8% to 48% based on the wallaba resin content of the molding composition.

5. The composition of claim 2 in which the hexamethylene tetramine is from 8% to 48% based on the wallaba resin content of the molding composition.

6. The process as set forth in claim 3 in which the hexamethylene tetramine is from 8% to 48% based on the wallaba resin content of the molding composition.

7. The process as set forth in claim 3 in which the composition is milled to produce a product which shows less gassing during curing.

8. The process of making a plastic thermosetting composition which comprises incorporating wallaba wood flour with a phenol-formaldehyde resin containing hexamethylene tetramine.

9. The process of making a plastic thermosetting composition which comprises incorporating wallaba wood flour and wallaba resin with a phenol-formaldehyde resin containing hexamethylene tetramine.

References Cited in the file of this patent

UNITED STATES PATENTS

| Number | Name | Date |
|---|---|---|
| 2,260,187 | Miller | Oct. 21, 1941 |
| 2,362,628 | Glycofrides | Nov. 14, 1944 |
| 2,364,744 | Morris | Dec. 12, 1944 |
| 2,383,558 | Martin | Aug. 28, 1945 |
| 2,418,293 | Faber | Apr. 1, 1947 |
| 2,569,301 | Fleck et al. | Sept. 25, 1951 |

FOREIGN PATENTS

| Number | Country | Date |
|---|---|---|
| 24,124 | Norway | Jan. 12, 1914 |
| 114,847 | Australia | Mar. 11, 1941 |